(12) United States Patent
Vicentini

(10) Patent No.: US 11,905,123 B2
(45) Date of Patent: Feb. 20, 2024

(54) APPARATUS AND METHOD FOR VARYING THE PITCH BETWEEN MOVING ARTICLES

(71) Applicant: Fameccanica.Data S.p.A., San Giovanni Teatino (IT)

(72) Inventor: Gabriele Vicentini, San Giovanni Teatino (IT)

(73) Assignee: Fameccanica.Data S.p.A. (IT)

( * ) Notice: Subject to any disclaimer, the term of this patent is extended or adjusted under 35 U.S.C. 154(b) by 10 days.

(21) Appl. No.: 17/688,089

(22) Filed: Mar. 7, 2022

(65) Prior Publication Data

US 2022/0289498 A1 Sep. 15, 2022

(30) Foreign Application Priority Data

Mar. 10, 2021 (EP) .................................... 21161713

(51) Int. Cl.
*B65G 47/31* (2006.01)
*B65G 21/20* (2006.01)

(52) U.S. Cl.
CPC ......... *B65G 47/31* (2013.01); *B65G 21/2036* (2013.01)

(58) Field of Classification Search
CPC .... B65G 47/31; B65G 21/2036; B65G 15/42; B65G 15/58; B65G 47/843
See application file for complete search history.

(56) References Cited

U.S. PATENT DOCUMENTS

| 4,815,581 | A | * | 3/1989 | Deutschlander ... | B65G 21/2036 198/689.1 |
| 6,000,528 | A | * | 12/1999 | van Maanen .......... | B65G 47/31 198/689.1 |
| 6,044,959 | A | * | 4/2000 | Monsees ................ | B65G 47/31 198/689.1 |
| 6,098,785 | A | * | 8/2000 | Van Maanen ........ | B65G 47/915 198/459.8 |
| 6,273,238 | B1 | * | 8/2001 | Wooldridge ........... | B65G 47/31 198/459.8 |
| 8,011,493 | B2 | * | 9/2011 | Giuliani ............... | B65G 47/848 198/406 |
| 10,112,784 | B2 | * | 10/2018 | Toto ..................... | B65G 47/848 |
| 2005/0150745 | A1 | | 7/2005 | Simpson et al. | |

FOREIGN PATENT DOCUMENTS

| DE | 3814341 C1 | 3/1989 | |
| DE | 10204933 A1 | 8/2003 | |
| DE | 10204933 A1 * | 8/2003 | ............. B65G 17/26 |

OTHER PUBLICATIONS

European Search Report dated Aug. 18, 2021. 9 pages.

* cited by examiner

*Primary Examiner* — Gene O Crawford
*Assistant Examiner* — Abby A Jorgensen
(74) *Attorney, Agent, or Firm* — RMCK Law Group PLC

(57) ABSTRACT

Apparatus for varying a pitch between moving articles includes a phaser conveyor having a dosed-loop central belt and two closed-loop side belts including respective rows of stop elements configured to engage side portions of articles projecting laterally outside the central belt. As compared to rotary repitching devices, the apparatus according to the invention is much simpler and more energy-efficient, which has a positive impact on sustainability.

13 Claims, 4 Drawing Sheets

APPARATUS AND METHOD FOR VARYING THE PITCH BETWEEN MOVING ARTICLES

CROSS-REFERENCE TO RELATED APPLICATION

This application claims priority to European Patent Application No. 21161713.9 filed Mar. 10, 2021. The disclosure of the above application is incorporated herein by reference in its entirety.

FIELD OF THE INVENTION

The invention relates in general to manufacturing and/or packaging of articles moving at a high-speed in a production/packaging line.

More specifically, the invention relates to an apparatus and to a method for changing the pitch—operation also known as "pitch change" or "re-pitching"-between articles being conveyed.

The invention has been developed with particular attention to the field of manufacturing or packaging of sanitary articles, such as sanitary pads, pantry liners, diapers, training pants, paper towels, female hygiene products, face masks, plasters, etc.

The scope of the invention is not in any case limited to this possible field of application.

DESCRIPTION OF THE RELATED ART

The state of the art regarding re-pitching devices is somewhat extensive in terms of the relevant patent literature.

In this connection, reference may be made, for example, to documents such as U.S. Pat. Nos. 4,880,102, 5,480,021, or U.S. Pat. No. 4,506,779 and also to U.S. Pat. Nos. 4,726,876, 3,728,191, and U.S. Pat. No. 4,483,351 and EP-A-1 179 495, which disclose rotary repitch apparatuses. From the latter three documents cited there is known the possibility of obtaining, together with the variation of the pitch, an orientation of the articles with a combined action, referred to as "turn and repitch".

The main disadvantage of rotary repitch apparatuses is the need to provide a plurality of motors dedicated to several shoes for periodically accelerating and decelerating the shoes during rotation, thus making the apparatuses complex, cumbersome and expensive. Another disadvantage is the need to stock many spare parts.

Document WO-2012/009491-A1 discloses an apparatus for transferring articles which is adapted to vary the linear speed of the articles conveyed on transport elements. The apparatus comprises a first transfer surface driven by a first motor and second transfer surface driven by a second motor. The first and second transfer surfaces receive and transfer different portions of an article at different speeds such that a desired amount of spacing can be provided between discrete articles. Thus, the spacing between the trailing end of a previous article and the leading end of a subsequent article can be desirably controlled by adjusting the acceleration/deceleration of movable surfaces of the apparatus. Therefore, the apparatus of document WO-2012/009491-A1 results inappropriate for changing the pitch of moving articles easily and efficiently.

In view of the above, there is the need of a solution adapted to vary the pitch of moving articles which results simpler and less complex than the prior art.

OBJECT AND SUMMARY OF THE INVENTION

The object of the present invention is to overcome the drawbacks and limitations of the prior art.

Another object of the present invention is to provide an apparatus of the type indicated above, which ensures an excellent stability of the articles during the repitch operation.

According to the present invention, these objects are achieved by an apparatus having the features of claim 1.

According to another aspect, the invention relates to a method for changing the pitch between moving articles having the features of claim 11.

The claims form an integral part of the disclosure provided here in relation to the invention.

BRIEF DESCRIPTION OF THE DRAWINGS

The present invention will now be described in detail with reference to the attached drawings, given purely by way of non-limiting example, wherein.

DETAILED DESCRIPTION

Figure 1:
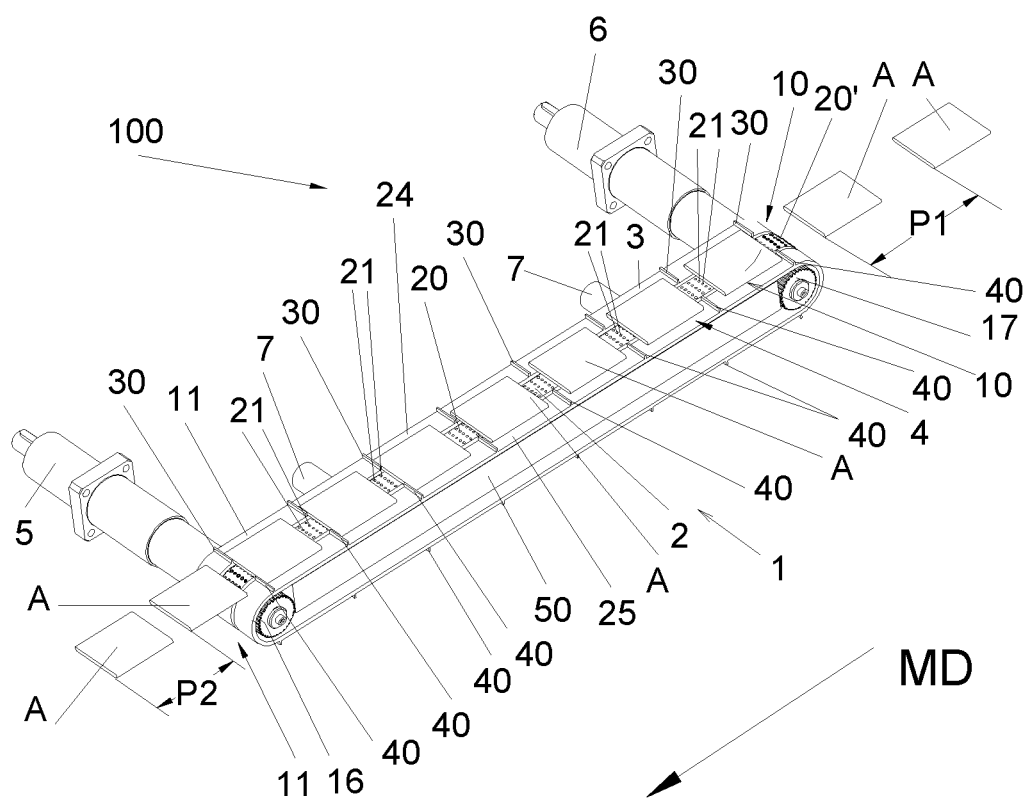
FIGS. 1, 2 are a perspective view and a plan view illustrating a first embodiment of an apparatus according to the invention.

With reference to the figures, an apparatus for varying the pitch between moving articles is indicated by the reference numeral 100. In general terms, the apparatus 100 according to the invention is configured to vary the pitch between adjacent articles A in a continuous flow of moving articles A advancing along a machine direction MD.

The apparatus 100 comprises a phaser conveyor 1 having an infeed section 10 and an outfeed section 11, wherein the infeed section 10 is configured for receiving a flow of articles A which advance with a first pitch P1. By way of non-limiting example, the figures refer to a phaser conveyor 1 of the motor-driven-belt type.

The apparatus 100 comprises an infeed conveyor 8 configured for feeding the phaser conveyor 1 with a flow of articles A along a machine direction MD, in which the articles A conveyed by the infeed conveyor 8 are spaced apart from each other in said machine direction MD by a first pitch P1. It is to be noted that the infeed conveyor 8 is described in detail in a subsequent section of this description.

Figure 2:
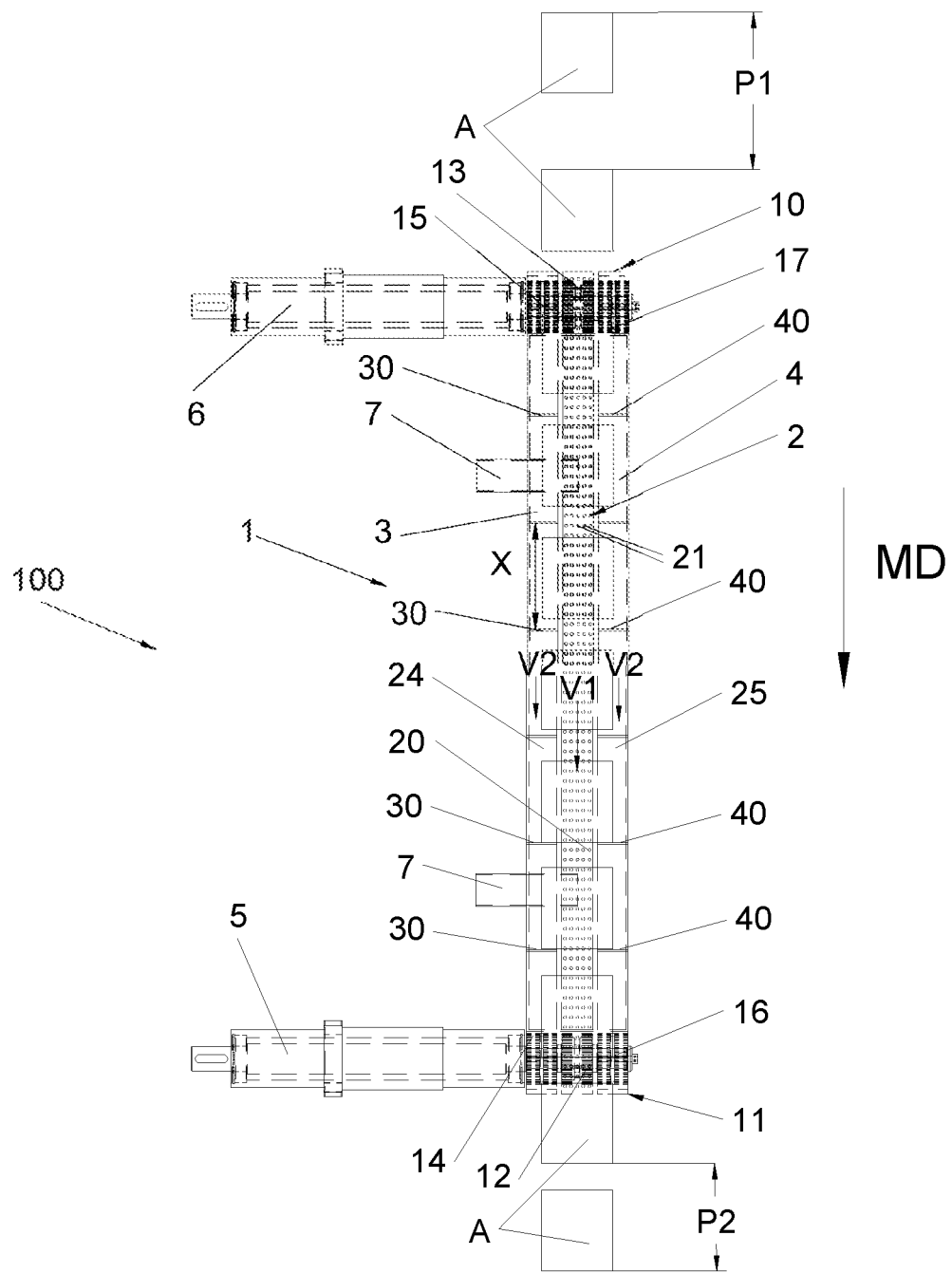

According to the invention, the phaser conveyor 1 comprises a central belt 2 having a transport branch 20' which extends along the machine direction MD. As shown in FIG. 2, the central belt 2 is a closed-loop belt having a flat support surface 20 configured for receiving thereon the articles A.

The closed-loop central belt 2 is wound about two pulleys 12, 13, at least one of which is driven by a first motor 5. The first motor 5 is configured to continuously drive the central belt 2 along the machine direction MD at a first speed V1.

The phaser conveyor 1 comprises a plurality of idle support rollers 7 which support the transport branch 20' of the central belt 2.

It is to be noted that the apparatus 100 is configured to stably retain the articles A on the central belt 2 during transfer from a gripping position to a release position, and to stop the retaining action of the articles A in the release position.

In this connection, the apparatus 100 comprises a vacuum grip system including a stationary suction box 50 connected to a sub-atmospheric pressure source and having a suction surface facing the transport branch 20' of the closed-loop central belt 2. The closed-loop central belt 2 has a plurality of through holes 21 open on the flat support surface 20 and facing the stationary suction box 50, so as to provide a gripping condition for the articles A on the transport branch 20' during the movement from the infeed section 10 to the outfeed section 11. The vacuum gripping condition remains active to retain the articles A on the transport branch 20' during the path in which the through holes 21 face the stationary suction box 50, in the path from the infeed section 10 to the outfeed section 11.

According to a further feature of the invention, the phaser conveyor 1 comprises two closed-loop side belts 3, 4, having respective branches extending on opposite sides of the transport branch 20' of the central belt 2. The side belts 3, 4 have respective support surfaces 24, 25 which may be coplanar with the flat support surface 20 of the transport branch 20' of the central belt 2 to form a continuous surface for supporting and transporting the articles A.

Naturally, the width of the belts 2, 3, 4 in a direction transversal to the machine direction MD can be different from what is illustrated, depending on the size of the articles A to be conveyed.

The side belts 3, 4 are driven by a second motor 6 configured to synchronously drive the side belts 3, 4 at a second speed V2 different from the first speed V1. As will be described in more detail in the following, the first speed V1 of the central belt 2 may be higher or lower than the second speed V2 of the side belts 3, 4.

As shown in FIG. 2, the side belts 3, 4 are wound on one side around two drive pulleys 15, 17 arranged on the same axis and powered by the second motor 6, and on the opposite side around two idle pulleys 14, 16 arranged on the same axis. As previously indicated, the central belt 2 is a closed-loop belt wound around two pulleys 12, 13, at least one of which is driven by a first motor 5. It is to be noted that the pulley 12 is a drive pulley arranged on the same axis of the idle pulleys 14, 16, and the pulley 13 is an idle pulley arranged on the same axis of the drive pulleys 15, 17.

According to a further feature of the invention, the side belts 3, 4 comprise respective rows of stop elements 30, 40 configured to engage side portions of said articles A projecting laterally outside the transport branch 20' of the central belt 2. The stop elements 30, 40 of each side belt 3, 4 are spaced apart from each other in the machine direction MD by a constant distance X. The stop elements 30, 40 of each side belt 3, 4 are aligned to the stop elements 30, 40 of the other belt 3, 4 in a direction transversal to the machine direction MD. In a possible embodiment, the stop elements 30, 40 are ribs protruding from respective flat surfaces. In a possible embodiment, the stop elements 30, 40 are ribs having a width in a direction transversal to the machine direction MD equal to the width of the side belts 3, 4.

In operation, the phaser conveyor 1 transports articles A having a width in a direction transversal to the machine direction MD greater than the width of the central belt 2. The articles are retained by vacuum suction on the flat support surface 20 of the transport branch 20' of the central belt 2 and advance in the machine direction MD at the first speed V1 of the central belt 2. The difference between the first speed V1 of the central belt 2 and the second speed V2 of the side belts 3, 4 causes the articles A to come into contact with respective pairs of transversally aligned stop elements 30, 40. When the articles A retained on the central belt 2 come into contact with respective pairs of stop elements 30, 40, they start to move in the machine direction MD at the second speed V2, so that they slide with respect to the flat support surface 20 of the central belt 2. At the outfeed section 11 the articles A are spaced apart from each other in the machine direction MD by a second pitch P2 corresponding to the distance X between the stop elements 30, 40.

In a possible embodiment, shown in FIGS. 1 and 2, the speed V1 of the central belt 2 is higher than the second speed V2 of the side belts 3, 4. Consequently, in operation, an article A conveyed on the infeed section 10 of the phaser conveyor 1 reaches a pair of transversally aligned stop elements 30, 40 located in a more advanced position with respect to the article A, so as to make contact between a leading edge portion of the article A and said pair of transversally aligned stop elements 30, 40 at the outfeed section 11 of the phaser conveyor 1.

Figure 3:
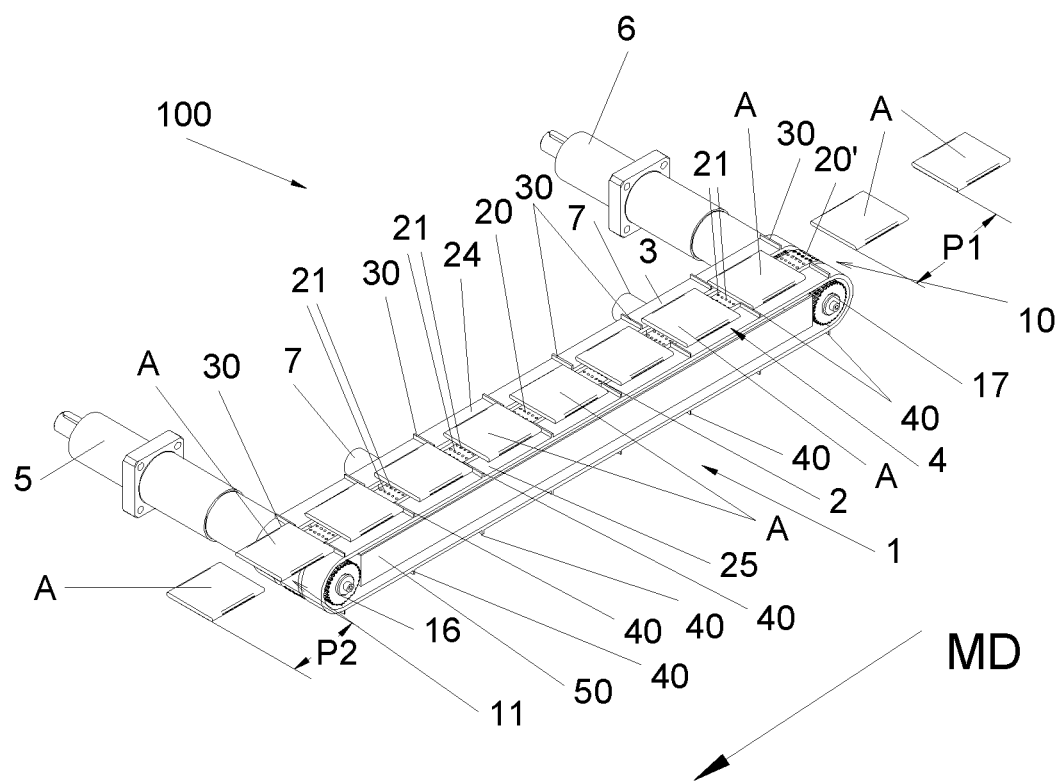
FIG. 3 is a perspective view showing a second embodiment of an apparatus according to the invention.
Figure 4:
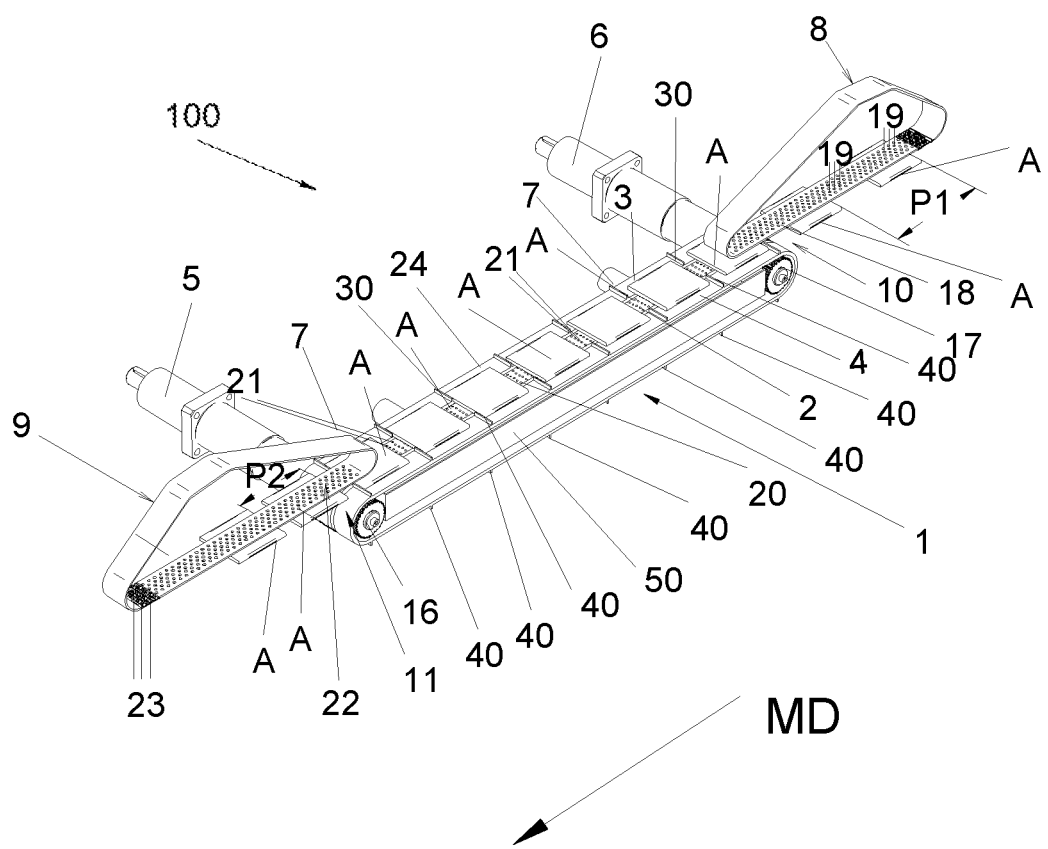
FIG. 4 is a perspective view showing further features of an apparatus according to the present invention.

In a possible embodiment illustrated in FIG. 3, the side belts 3, 4 are driven with a speed V2 higher than the speed V1 of the central belt 2 which retains the articles A. Consequently, in operation, an article A conveyed on the infeed section 10 of the phaser conveyor 1 is reached by a pair of transversally aligned stop elements 30, 40 located in a back position with respect to the article A, so as to make contact between a trailing edge portion of the article A and said pair of transversally aligned stop elements 30, 40 at the outfeed section 11 of the phaser conveyor 1.

In one or more embodiments, also the lateral belts 3, 4 may comprise a plurality of through holes facing the stationary suction box 50, so as to provide a gripping condition for the articles A on the support surfaces 24, of the side belts 3, 4 during the movement from the infeed section 10 to the outfeed section 11. The retaining force is properly adjusted in order to give greater stability to articles A with respect to embodiments with through holes provided only on the central belt 2, but at the same time enabling sliding of the side belts 3, 4 under the articles A. In a possible embodiment, the through holes on the side belts may be provided only on the portions adjacent to the stop elements 30, 40.

As previously indicated, the apparatus 100 comprises an infeed conveyor 8—schematically illustrated in figure— configured for feeding to the phaser conveyor 1 the articles A spaced apart from each other in said machine direction MD by the first pitch P1. The infeed conveyor 8 can be of the motor-driven-belt type. Preferably, the infeed conveyor 8 comprises a closed-loop belt defining a downwardly facing transport branch 18 aligned with the central belt 2 along the machine direction MD and having a terminal end portion vertically overlapped to the transport branch 20' of the central belt 2 at the infeed section 10. The closed-loop belt of the infeed conveyor 8 has a width—in a direction transversal to said machine direction MD—substantially equal to the width of the central belt 2, so that said terminal end portion does not interfere with the stop elements 30, 40 of the side belts 3, 4. The transport branch 18 of the infeed conveyor 8 may have a width lower than the width of the central belt 2. In any case, if the infeed conveyor 8 is vertically superimposed on the central belt 2, the infeed conveyor 8 has to be arranged so as to not interfere with the stop elements 30, 40 of the side belts 3, 4.

The infeed conveyor 8 comprises a vacuum grip system which is configured and controlled for holding the articles A conveyed by the infeed conveyor 8 against the downwardly facing transport branch 18 of the infeed conveyor 8 until the article A is released on, and gripped by, the central belt 2 of the phaser conveyor 1. In this respect, the infeed conveyor 8 comprises a plurality of through holes 19 and a stationary suction box connected to a sub-atmospheric pressure source, so as to provide a sucking surface for retaining the conveyed articles A against said downwardly facing transport branch 18 of the infeed conveyor 8 until they are released on the phaser conveyor 1. It is to be noted that, the vacuum gripping condition of the infeed conveyor 8 remains active to retain the articles A on the transport branch 18 during the path in which the through holes 19 are faced to a stationary suction box. The interruption of the retaining action of the infeed conveyor 8 is phased with the beginning of the retaining action of the phaser conveyor 1 at the infeed section 10. The infeed conveyor 8 is phased with the side belts 3, 4, so that the articles A are passed on the infeed section 10 of the phaser conveyor 1 in a position between two consecutive stop elements 30, 40. The presence of the stop elements 30, 40 only on the side belts 3, 4 enables using an infeed conveyor 8 arranged above and between the side belts 3, 4, which does not interfere with the stop elements 30, 40, which ensures a smooth transition of the articles A from the infeed conveyor 8 to the phaser conveyor 1.

In a possible embodiment, the apparatus comprises an outfeed conveyor 9 operatively connected to the outfeed section 11 of the phaser conveyor 1, arranged for receiving and transporting the articles A spaced by the second pitch P2, after the repitching operation carried out on the phaser conveyor 1. The outfeed conveyor 9 can be arranged similarly to the infeed conveyor 8 previously described.

The outfeed conveyor 9 is also arranged so as to avoid interference with the stop elements 30, 40 of the side belts 3, 4. In a possible embodiment the outfeed conveyor comprises a closed-loop belt defining a downwardly facing transport branch 22 aligned with the central belt 2 along the machine direction MD and having a first portion vertically overlapped on the transport branch 20' of the central belt 2 at the outfeed section 11. The closed-loop belt of the outfeed conveyor 9 has a width—in a direction transversal to said machine direction MD—substantially equal to the width of the central belt 2, so that it does not interfere with the stop elements 30, 40 of the side belts 3, 4.

In a possible embodiment, the outfeed conveyor 9 comprises a vacuum grip system comprising a plurality of through holes 23 formed in the belt of the outfeed conveyor 9, configured and controlled for holding each article A conveyed by the outfeed conveyor 9 against said downwardly facing transport branch 22 of the outfeed conveyor 9. It is to be noted that the interruption of the retaining action of the phaser conveyor 1 at the outfeed section 11 is phased with the beginning of the retaining action of the outfeed conveyor 9.

Due to the features indicated above, the inlet and outfeed conveyors 8, 9 provide an effective transport of the articles A to and from the phaser conveyor 1, without interference with the stop elements 30, 40. The presence of the stop elements 30, 40 only on the side belts 3, 4 enables infeed and outfeed conveyors 8, 9 arranged above and between the side belts 3, 4, in order to guarantee a smooth transition of the articles A.

As it is evident from the above description, the present invention provides a solution capable to vary the pitch of a flow of moving articles A in a simple and automatic way, ensuring an effective transport of articles of different types.

As compared to the rotary repitching devices of the prior art, the invention provides a solution which is much simpler and energy-efficient, which has a positive impact on sustainability.

Of course, without prejudice to the principle of the invention, the details of construction and the embodiments can be widely varied with respect to those described and illustrated, without thereby departing from the scope of the invention as defined by the claims that follow.

The invention claimed is:

1. An apparatus for varying a pitch between moving articles comprising:
    an infeed conveyor configured for feeding a flow of articles along a machine direction spaced apart from each other in said machine direction by a first pitch, and
    a phaser conveyor having an infeed section and an outfeed section, wherein the infeed section is configured for receiving said flow of articles from said infeed conveyor that are spaced apart from each other by said first pitch,
    wherein said phaser conveyor comprises:
    a dosed-loop central belt having a flat support surface configured for receiving thereon articles of said flow of articles, the dosed-loop central belt having a plurality of through holes open on said support surface and a transport branch extending from said infeed section to said outfeed section,
    a first motor configured to drive said dosed-loop central belt at a first speed,
    a stationary suction box connected to a sub-atmospheric pressure source and having a suction surface facing said transport branch of said dosed-loop central belt so as to retain said articles on said transport branch during movement between the infeed section and the outfeed section,
    two dosed-loop side belts, having respective branches extending on opposite sides of said transport branch of said dosed-loop central belt, wherein the dosed-loop side belts comprise respective rows of stop elements, the stop elements of each dosed- loop side belt being spaced apart with respect to each other by a constant distance, and wherein the stop elements of each dosed-loop side belt are aligned to the stop elements of the other dosed-loop side belt in a direction transversal to said machine direction, said stop elements being configured to engage side portions of said articles projecting laterally outside the transport branch of the dosed-loop central belt,
    a second motor configured to synchronously drive the closed-loop side belts at a second speed different from the first speed,
    wherein, in operation, the phaser conveyor transports articles having a width in a direction transversal to said machine direction greater than a width of the closed-loop central belt, and wherein a speed difference between the closed-loop central belt and the closed-loop side belts causes the articles to come into contact with a pair of transversally aligned stop elements of the closed-loop side belts and sliding of the articles on the closed-loop central belt so that at said outfeed section of the phaser conveyor, the articles are spaced by a second pitch corresponding to said distance between said stop elements, and
    wherein said closed-loop side belts have respective branches facing said stationary suction box and comprise respective through holes so as to retain by vacuum suction lateral portions of said articles projecting laterally outside said closed-loop central belt.

2. The apparatus of claim 1, wherein the closed-loop side belts have respective support surfaces coplanar with the support surface of the transport branch of the closed-loop central belt so as to form a continuous surface for supporting and transporting the articles.

3. The apparatus of claim 1, wherein the stop elements are ribs protruding from respective flat surfaces.

4. The apparatus of claim 1,
wherein said first speed of the closed-loop central belt is higher than said second speed of the closed-loop side belts,
wherein, in operation, an article conveyed on the infeed section of the phaser conveyor reaches said pair of transversally aligned stop elements located in a more advanced position with respect to the article, so as to make contact between a leading edge portion of the article and said pair of transversally aligned stop elements at the outfeed section of the phaser conveyor.

5. The apparatus of claim 1, wherein said first speed of the closed-loop central belt is lower than said second speed of the closed-loop side belts,
wherein, in operation, an article conveyed on the infeed section of the phaser conveyor is reached by a pair of transversally aligned stop elements located in a back position with respect to the article, so as to make contact between a trailing edge portion of the article and said pair of transversally aligned stop elements at the outfeed section of the phaser conveyor.

6. The apparatus of claim 1, wherein said infeed conveyor comprises a closed-loop belt defining a downwardly facing transport branch aligned along the machine direction with the closed-loop central belt and having a terminal end portion vertically superimposed on the transport branch of the closed-loop central belt at the infeed section, said closed-loop belt of the infeed conveyor having a width, in a direction transversal to said machine direction, equal to or smaller than the width of the closed-loop central belt, so that said terminal end portion does not interfere with the stop elements (of the closed-loop side belts.

7. The apparatus of claim 1, wherein said through holes of said closed-loop side belts are positioned only on portions of said closed-loop side belts adjacent to said stop elements.

8. The apparatus of claim 6, wherein the closed-loop belt of the infeed conveyor comprises a plurality of through holes and wherein the infeed conveyor comprises a stationary suction box connected to the sub-atmospheric pressure source, so as to retain by vacuum suction said articles against said downwardly facing transport branch of the closed-loop belt of the infeed conveyor until they are released on the phaser conveyor.

9. The apparatus of claim 1, comprising an outfeed conveyor configured for receiving from the outfeed section of the phaser conveyor said flow of articles, spaced apart from each other in said machine direction by said second pitch.

10. The apparatus of claim 9, wherein said outfeed conveyor comprises another closed-loop belt defining a downwardly facing transport branch aligned along the machine direction with the closed-loop central belt and having a first portion vertically superimposed on the transport branch of the closed-loop central belt at the outfeed section, said closed-loop belt of the outfeed conveyor having a width, in a direction transversal to said machine direction, equal to or smaller than the width of the closed-loop central belt, so that said first portion does not interfere with the stop elements (of the closed-loop side belts .

11. A method for varying a pitch between moving articles, including:
feeding a flow of articles along a machine direction spaced apart from each other in said machine direction by a first pitch),
receiving said flow of articles spaced apart from each other by said first pitch on a closed-loop central belt having a transport branch extending between an infeed section and an outfeed section,
retaining articles of said flow of articles on said transport branch of the closed- loop central belt by vacuum suction during movement between the infeed section and the outfeed section, wherein said articles have a width in a direction transversal to said machine direction greater than a width of said closed-loop central belt so that said articles have lateral portions projecting laterally outside said closed-loop central belt,
driving said closed-loop central belt at a first speed,
providing a pair of closed-loop side belts extending on opposite sides of said transport branch of said closed-loop central belt, wherein the closed-loop side belts comprise respective rows of stop elements, the stop elements of each dosed-loop side belt being spaced apart with respect to each other by a constant distance, and wherein the stop elements of each dosed-loop side belt are aligned to the stop elements of the other dosed-loop side belt in a direction transversal to said machine direction,
synchronously driving said dosed-loop side belts at a second speed different from said first speed,
engaging said lateral portions of said articles projecting outside of said dosed- loop central belt with respective pairs of transversally aligned stop elements of said closed-loop side belts, and spacing said articles from each other in said machine direction at said outfeed section by a second pitch corresponding to said distance between said stop elements,
retaining lateral portions of said articles projecting laterally outside said dosed-loop central belt on said dosed-loop side belts by vacuum suction through holes comprised in said closed look side belts.

12. The method of claim 11, wherein said first speed of the dosed-loop central belt is higher than the second speed of the closed-loop side belts,
wherein, in operation, an article conveyed on the infeed section of the phaser conveyor reaches a pair of transversally aligned stop elements located in a more advanced position with respect to the article, so as to make contact between a leading edge portion of the article and said pair of transversally aligned stop elements at the outfeed section of the phaser conveyor.

13. The method of claim 11 wherein the first speed of the closed-loop central belt is lower than the second speed of the closed-loop side belts,
wherein, in operation, an article conveyed on the infeed section of the phaser conveyor is reached by a pair of transversally aligned stop elements located in a back position with respect to the article, so as to make contact between a trailing edge portion of the article and said pair of transversally aligned stop elements at the outfeed section of the phaser conveyor.

* * * * *

UNITED STATES PATENT AND TRADEMARK OFFICE
CERTIFICATE OF CORRECTION

PATENT NO. : 11,905,123 B2  
APPLICATION NO. : 17/688089  
DATED : February 20, 2024  
INVENTOR(S) : Gabriele Vicentini Page 1 of 1

It is certified that error appears in the above-identified patent and that said Letters Patent is hereby corrected as shown below:

On the Title Page

(71) Applicant address information should be listed as:  
- Fameccanica.Data S.p.A., San Giovanni Teatino (Chieti), ITALY -

(72) Inventor address information should be listed as:  
- Gabriele VICENTINI, San Giovanni Teatino (Chieti), ITALY -

Signed and Sealed this  
Eleventh Day of March, 2025

Coke Morgan Stewart  
*Acting Director of the United States Patent and Trademark Office*